United States Patent [19]

Jackson

[11] Patent Number: 4,580,061
[45] Date of Patent: Apr. 1, 1986

[54] TIME SWITCHES

[75] Inventor: Harold E. Jackson, Winchester, England

[73] Assignee: Plympton Patents Limited, Winchester, England

[21] Appl. No.: 114,344

[22] Filed: Jan. 22, 1980

[30] Foreign Application Priority Data

Jan. 23, 1979 [GB] United Kingdom ............... 7902393

[51] Int. Cl.⁴ .............................................. H02J 3/00
[52] U.S. Cl. ................................... 307/41; 307/141.8; 219/486
[58] Field of Search ................... 307/115, 38, 41, 141, 307/141.4, 141.8; 219/486, 483, 484, 485

[56] References Cited

U.S. PATENT DOCUMENTS 2,805,331  9/1957  Wolford ..................... 307/141 X
3,586,869  6/1971  Kompelien ................. 307/41
3,886,378  5/1976  Morgan ...................... 307/141.4

OTHER PUBLICATIONS

Operational Amplifiers and Linear Integrated Circuits, Coughlin et al., 1977, pp. 117-118.

Primary Examiner—James L. Dwyer
Attorney, Agent, or Firm—Mason, Fenwick & Lawrence

[57] ABSTRACT

A time switch (100) comprises terminals (110) spaced around a slip ring (108) connected to a voltage source (V). A motor (104) drives a brush (102) to sequentially connect the terminals (110) to the slip ring (108) to energize the terminals in sequence. Each terminal (110)—as shown for one of them designated 112—is connected via a respective transistor (116) and manually operable switch (124) to a pair of common output conductors or bus-bars (130, 132), whereby for each successive period of time corresponding to each successive terminal (110) being energized the conductors (130, 132) are energized in accordance with the setting of a respective one of the switches. Thus, a desired time-varying pattern of energization of the conductors (130, 132) to accomplish a control function, e.g. the control of a central heating system to provide different heat outputs at different times of the day, can be set up at will simply by adjusting the various switches (124).

7 Claims, 3 Drawing Figures

4,580,061

TIME SWITCHES

TECHNICAL FIELD

This invention relates to time switches.

BACKGROUND ART

It is known to equip various kinds of apparatus with time switches in order to put the apparatus into different conditions or modes during different parts of a predetermined period of time, for example during a 24 hour period. For instance, it is common to equip a central heating system with a time switch to cause heat outlets of the system to produce different levels of heating during different parts of the day. The time switch may comprise a plurality of terminals and means to energise the terminals in sequence. For instance, in a time switch for a central heating system, one terminal may be energised for a period of the day during which high level heating is to be provided and another terminal energised for a different period of the day during which low level heating is to be provided. A disadvantage of such a time switch is that the said two terminals, which act as output terminals of the time switch, are energised at fixed times determined by the construction of the switch, whereby the time switch must be specifically designed for a particular application.

SUMMARY OF THE INVENTION

It is an object of the present invention to provide a time switch which provides an output energisation pattern that can be set up as desired for a particular application.

According to the present invention there is provided a time switch comprising a plurality of terminals and means to energise the terminals in sequence, characterised by a plurality of common output conductors and a greater plurality of switch means each connecting a respective one of the terminals to the common output conductors, whereby for each successive period of the time corresponding to each successive terminal being energised the common output conductors are energised in accordance with the setting of a respective one of the switches.

With a time switch in accordance with the invention, a time-varying pattern of energisation of the common output conductors, which can be used for control purposes of various kinds, can be simply programmed by setting the switches. For instance, suppose that there are 24 terminals energised at one hour intervals, there are 24 switches connecting the respective terminals to two common output conductors, and that the time switch is used in the above-mentioned central heating control application, whereby energisation of one conductor causes low level heating and energisation of the other conductor causes high level heating. By setting the switches, one can provide either high or low level heating during each one hour interval as desired. Further, if the switches have a position in which neither of the common output conductors is energised when the associated terminal is energised, one can also choose to have no heating at all during at least one of the one hour intervals.

The terminals may be connected to the switches via respective current switching devices, such as transistors, to minimise the current drawn from the means to energise the terminals in sequence.

The means to energise the terminals in sequence may comprise a slip ring and a rotatably driveable brush that successively engages the terminals, which are in the form of contacts spaced around the slip ring.

The time switch may comprise a second plurality of terminals also arranged to be energised in sequence at times mutually independent of the time at which the terminals of the first-mentioned plurality are energised, whereby the time switch can be used for carrying out two different control functions. For example, in the above-mentioned case where the means to energise the first plurality is a slip ring and brush, the second plurality of terminals can comprise contacts spaced around the slip ring and successively engaged by a second brush disposed, for example, opposite the first-mentioned brush, and mounted to be rotatably driveable with the first-mentioned brush.

The time switch may further comprise means responsive to energisation of any one or more of said terminals and said common output conductors to provide a signal for executing a further control function.

BRIEF DESCRIPTION OF THE DRAWING

The invention will now be further described, by way of example, with reference to the accompanying drawing, in which.

DETAILED DESCRIPTION OF THE PREFERRED EMBODIMENT

Figure 1:
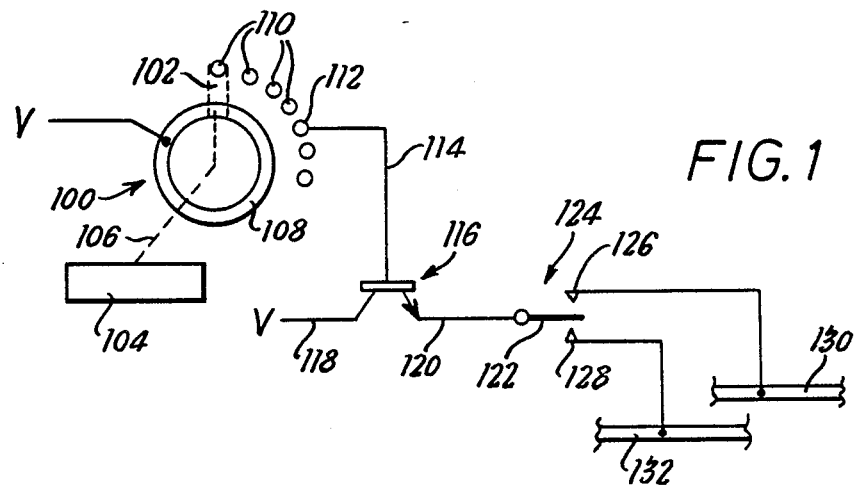
FIG. 1 is a schematic view of a time switch embodying the invention.

FIG. 1 shows a time switch 100 comprising a brush 102 rotationally driven by an electric motor 104, as shown schematically by a dotted line 106, at a speed of one revolution every 24 hours and constantly in contact with a slip ring 108. The brush 102 successively engages each of a plurality of contacts 110 for a period of one or more hours in accordance with the shape or circumferential length of the contacts. The slip ring 108 is fed with a voltage V. When the brush 102 engages, for example, a particular one of the contacts 110 designated 112 in FIG. 1, the voltage V is applied via a line 114 to the base of a transistor 116, which, since its collector is fed with the voltage V, then becomes conductive so that current can pass via lines 118 and 120 to a movable contact 122 of a switch 124. The switch 124 can be manually operated to connect the movable contact 122 to either of a pair of fixed contacts 126 or 128 of the switch which, in turn, are respectively connected to common output conductors or bus-bars 130 and 132; or can be operated, as shown, to disconnect the movable contact 122 so that no voltage is available at either of the bus-bars. For the period of time during which the brush 102 engages the contact 112, one or the other or neither of the bus-bars 130, 132 is energised according to the manual setting of the switch 124. Similarly, for each other period of time in each 24 hours, one or the other of the bus-bars 130, 132, or neither of them, can be energised via other transistor/switch circuits, like that described, interconnecting the other contacts 110 and the bus-bars 130, 132, whereby by setting the individual switches such as 124 a pattern of energisation of the bus-bars 130, 132 for a 24 hour period can be programmed at will.

This selective energisation of one or the other of the bus-bars 130, 132 can be used in a variety of applications. In a preferred application, wherein the time switch is fitted to a central heating system, the energisations pattern determines whether a higher or a lower level of heating is available at each area being heated by heat outlets (e.g. radiators) of the system, by energising a solenoid valve of the radiator via one or the other of a pair of thermostatic switches.

It is possible to modify the time switch 100 of FIG. 1 whereby the time switch switches a central heating system, as described, and also switches means for heating hot water to be used for other purposes. It is desirable that the preset times at which the central heating and the water heating are operative should be mutually independent, which requirements can be met in a simple manner as will now be described with reference to FIG. 2.

The modified time switch, shown in FIG. 2 at 200, is the same as the time switch 100 described with reference to FIG. 1, except as follows. As well as the rotationally driven brush 102, shown in FIG. 1, there is a further rotationally driven brush 202 disposed opposite to the brush 102. The brushes 102, 202 engage the slip ring 108 and, on the right-hand side of the time switch 200 as viewed in FIG. 2, they engage the series of contacts 110 so as to engage each contact for a period of one or more hours. Each of the contacts 110, as previously described with reference to a particular one of them designated 112, is connected to a switching circuit of the associated radiator solenoid valve and the arrangement is such that the contacts are traversed by one of the brushes 102, 202 once in every 24 hours. The brushes 102, 202 also engage, on the lefthand side of the time switch 200 as viewed in FIG. 2, a series of contacts 204, each such contact being engaged with the brushes for periods of one or more hours. Again, the arrangement is such that each contact 204 is engaged by one of the brushes 102, 202 once in every 24 hours. It is thus necessary for the pair of brushes 102, 202 to be driven rotationally by the motor 104 at a rate of one revolution every 48 hours. The contacts 204 are used in a conventional way, not shown, to activate the means for heating water to be used for purposes other than central heating.

Figure 2:
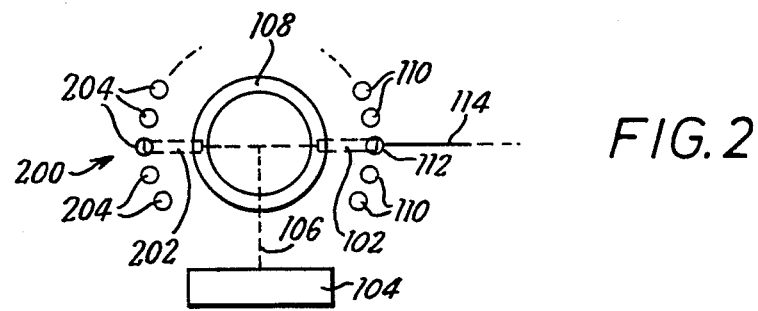
FIG. 2 shows a modification of the time switch of FIG. 1.

The time switch 100 of FIG. 1 or the time switch 200 of FIG. 2, in particular the motor, slip ring and brush(es) thereof, may, as is apparent, be embodied in electronic form and designed to carry out the same function(s).

Figure 3:
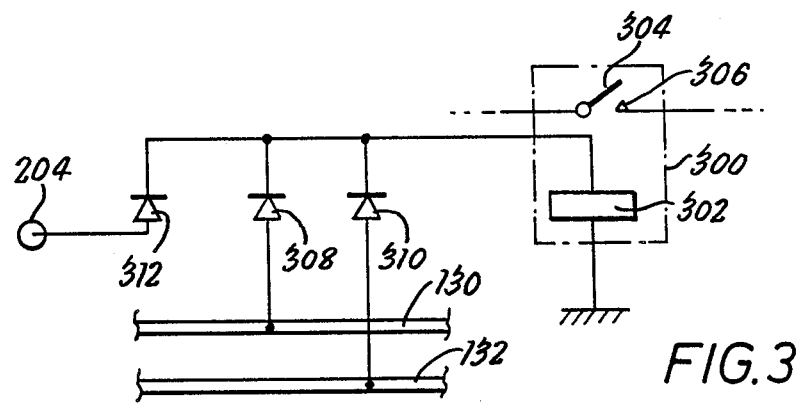
FIG. 3 shows a circuit that can be added to a circuit incorporating the time switch according to FIG. 2 to energise a device such as a boiler and/or a pump.

It may be desired that, when time switch control is employed, whenever central heating or hot water for other purposes is required, some other device, for example a water pump, the boiler or both, should also be activated. To meet this requirement, a circuit as shown in FIG. 3 can be added to the circuit described above with reference to FIG. 2. A relay 300 used to activate the other device comprises a coil 302 and contacts 304 and 306. The coil 302 is connected through diodes 308, 310 and 312, respectively, to the bus-bars 130 and 132 and to an appropriate one of the contacts 204 so that whenever any of these is energised the coil 302 is energised to close the contacts 304, 306 whereby the relay 300 operates to switch on the other device.

I claim:

1. Means for controlling the operation of a central heating system, said means comprising a time switch having a set of terminals and means for energising said terminals in sequence, a plurality of output conductors for separate connection to means for providing different levels of heat output in said system and a plurality of switches at least equal in number to said terminals and individually operable to selectively connect a respective one of said terminals to a respective one of said output conductors or to disconnect said one terminal from all said conductors, whereby for each successive period of time corresponding to each successive terminal being energised, one or none of said output conductors is energised in accordance with the setting of a respective one of said switches.

2. Control means according to claim 1, wherein said terminals are connected to said switches via respective current switching devices to minimise the current drawn from said means to energise the terminals in sequence.

3. Control means according to claim 1 or 2, wherein said means to energise said terminals in sequence comprises a slip ring, a brush and means to continuously rotate the brush, whereby the brush connects the terminals to the slip ring in sequence, the terminals being in the form of contacts spaced around the slip ring.

4. Control means according to claim 1, wherein the time switch includes a second set of terminals for connection to a separate water-heating system and means for simultaneously energising both sets of terminals in sequence.

5. Control means according to claim 1, wherein said means to energise said terminals in sequence comprises a slip ring, a brush and means to continuously rotate the brush, whereby the brush connects the terminals to the slip ring in sequence, the terminals being in the form of contacts spaced around the slip ring, and wherein the time switch further includes a second set of terminals in the form of contacts spaced around the slip ring for connection to a separate water-heating system, and a second brush continuously rotatable with said first-mentioned brush to energise one of said sets of terminals in sequence while the first-mentioned brush is energising the other set of terminals in sequence.

6. Control means according to claim 5, wherein said first and second brushes are disposed opposite one another.

7. Control means according to claim 1, 2, 4, 5 or 6, wherein each terminal of said time switch is shaped in accordance with the period of energisation required.

* * * * *